(12) United States Patent
Nishimiya et al.

(10) Patent No.: US 10,883,660 B2
(45) Date of Patent: Jan. 5, 2021

(54) ELECTRIC POWER TOOL, AND METHOD FOR DETECTING KICKBACK OF ELECTRIC POWER TOOL FROM WORKPIECE

(71) Applicant: MAKITA CORPORATION, Anjo-shi, Aichi (JP)

(72) Inventors: Takeshi Nishimiya, Anjo (JP); Hirokatsu Yamamoto, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 359 days.

(21) Appl. No.: 15/660,372

(22) Filed: Jul. 26, 2017

(65) Prior Publication Data

US 2018/0038546 A1   Feb. 8, 2018

(30) Foreign Application Priority Data

Aug. 5, 2016 (JP) .................. 2016-154763

(51) Int. Cl.
| | |
|---|---|
| *F16P 3/00* | (2006.01) |
| *B24B 23/02* | (2006.01) |
| *B25F 5/00* | (2006.01) |

(52) U.S. Cl.
CPC .............. *F16P 3/00* (2013.01); *B24B 23/028* (2013.01); *B25F 5/00* (2013.01)

(58) Field of Classification Search
CPC ....... B24B 23/028; B24B 49/006; B25F 5/00; B25F 5/024; B25F 5/02; B25F 5/001; F16P 3/00; B23Q 17/22; B23Q 11/0092; B23Q 11/0085; B25D 17/00; B25D 2250/221; B25B 23/00; B25B 23/0064; B25B 23/14; B25B 23/147; B25B 21/00
See application file for complete search history.

(56) References Cited

U.S. PATENT DOCUMENTS

| | | | | |
|---|---|---|---|---|
| 4,249,117 A | * | 2/1981 | Leukhardt ............ | B23D 59/008 173/181 |
| 4,267,914 A | * | 5/1981 | Saar ....................... | B23Q 11/04 173/181 |
| 5,142,210 A | * | 8/1992 | Kojima .............. | G05B 19/4062 318/275 |
| 6,479,958 B1 | * | 11/2002 | Thompson ................ | B25F 5/00 318/430 |

(Continued)

FOREIGN PATENT DOCUMENTS

| | | |
|---|---|---|
| JP | S64-6898 B2 | 2/1989 |
| JP | 2008-516789 A | 5/2008 |

(Continued)

OTHER PUBLICATIONS

Feb. 18, 2020 Office Action issued in Japanese Patent Application No. 2016-154763.

*Primary Examiner* — Thomas M Wittenschlaeger
(74) *Attorney, Agent, or Firm* — Oliff PLC (57) ABSTRACT

An electric power tool in one aspect of the present disclosure comprises a main body, a motor, a driver, a detector, and a kickback determiner. The kickback determiner determines that the main body is kicked back from a workpiece when an attitude change amount of the main body detected by the detector exceeds a preset kickback determination threshold during driving of the motor by the driver.

15 Claims, 6 Drawing Sheets

(56) References Cited

U.S. PATENT DOCUMENTS

| | | | |
|---|---|---|---|
| 7,395,871 B2* | 7/2008 | Carrier | B25F 5/00 173/1 |
| 7,403,131 B2* | 7/2008 | Gossett | B25C 7/00 30/382 |
| 7,552,781 B2* | 6/2009 | Zhang | B23D 59/001 173/1 |
| 7,650,699 B2* | 1/2010 | Yamamoto | B23B 49/00 33/334 |
| 8,579,041 B2* | 11/2013 | Pellenc | B25F 5/00 173/176 |
| 8,752,301 B2* | 6/2014 | George | B27B 17/083 30/381 |
| 8,818,548 B2* | 8/2014 | Aoki | A01D 34/828 340/680 |
| 9,464,893 B2* | 10/2016 | Vanko | G01C 9/00 |
| 9,475,180 B2* | 10/2016 | Eshleman | B25B 21/004 |
| 9,802,305 B2* | 10/2017 | Diem | B25D 16/00 |
| 9,962,807 B2* | 5/2018 | Klee | B23Q 11/0085 |
| 10,144,122 B2* | 12/2018 | Steurer | B23Q 11/0092 |
| 10,322,502 B2* | 6/2019 | Wirnitzer | B25D 16/00 |
| 2004/0181951 A1* | 9/2004 | Wittke | B23D 59/001 30/382 |
| 2006/0081386 A1 | 4/2006 | Zhang et al. | |
| 2008/0110653 A1* | 5/2008 | Zhang | B23D 59/001 173/1 |
| 2009/0065225 A1* | 3/2009 | Forster | B23Q 11/04 173/2 |
| 2010/0064532 A1* | 3/2010 | Wittke | B27G 19/003 30/382 |
| 2010/0282482 A1* | 11/2010 | Austin | G05B 19/41805 173/2 |
| 2011/0093110 A1* | 4/2011 | Stencel | B25B 21/00 700/110 |
| 2011/0114345 A1* | 5/2011 | Schlesak | B23Q 11/0092 173/1 |
| 2012/0036725 A1* | 2/2012 | Osborne | B27B 17/083 30/383 |
| 2013/0081293 A1 | 4/2013 | Delin et al. | |
| 2014/0166323 A1* | 6/2014 | Cooper | B23Q 11/0092 173/1 |
| 2015/0137721 A1* | 5/2015 | Yamamoto | B25F 5/00 318/400.15 |
| 2016/0089757 A1 | 3/2016 | Wirnitzer et al. | |
| 2017/0057038 A1* | 3/2017 | Coleman | B23Q 17/0961 |
| 2018/0099392 A1* | 4/2018 | Sunabe | B25D 11/005 |
| 2018/0099399 A1* | 4/2018 | Sunabe | B25D 16/00 |

FOREIGN PATENT DOCUMENTS

| | | |
|---|---|---|
| JP | 2011-20205 A | 2/2011 |
| JP | 2013-066999 A | 4/2013 |

* cited by examiner

ELECTRIC POWER TOOL, AND METHOD FOR DETECTING KICKBACK OF ELECTRIC POWER TOOL FROM WORKPIECE

CROSS-REFERENCE TO RELATED APPLICATIONS

This application claims the benefit of Japanese Patent Application No. 2016-154763 filed on Aug. 5, 2016 with the Japan Patent Office, and the entire disclosure thereof is incorporated herein by reference.

BACKGROUND

The present disclosure relates to kickback of an electric power tool from a workpiece. In the case of using an electric power tool, such as a grinder, for processing a workpiece by rotating a disk-shaped tip tool, when the tip tool is rotated and brought into abutment with a workpiece, a reaction force is applied from the workpiece to the tip tool, and a main body of the electric power tool is sometimes kicked back from the workpiece.

When such kicking back (hereinafter, also referred to as a "kickback") occurs, a load applied by the tip tool to a motor is rapidly decreased, and thus a rotation speed of the motor is rapidly increased. An electric power tool disclosed in Japanese Examined Patent Application Publication No. S64-006898 is configured such that, when a change rate of a rotation speed of a motor exceeds a threshold, it is determined that the electric power tool is kicked back from the workpiece (in other words, a kickback has occurred), and driving of the motor is stopped.

SUMMARY

However, the load applied to the motor is rapidly decreased not only when the electric power tool is kicked back from the workpiece, but also, for example, when the workpiece is cut off and the tip tool is released from the workpiece, or when a user separates the electric power tool from the workpiece.

Accordingly, in the case of detecting a kickback based on the change rate of the rotation speed of the motor as in the above-described electric power tool, a probability of misdetection of a kickback would be higher, and the driving of the motor might be stopped although no kickback has actually occurred, thereby giving an uncomfortable feeling to a user.

In one aspect of the present disclosure, it is preferred to reduce misdetection of a kickback of an electric power tool from a workpiece.

One aspect of the present disclosure is an electric power tool that comprises a main body, a motor, a driver, a detector, and a kickback determiner. The main body is configured to be mounted with a tool portion. The tool portion is configured to process a workpiece. The motor generates a driving force for driving the tool portion mounted to the main body. The driver is configured to drive the motor. The detector is configured to detect an attitude change amount of the main body. The kickback determiner is configured to determine that the main body is kicked back from the workpiece when the attitude change amount detected by the detector exceeds a preset kickback determination threshold during driving of the motor by the driver.

In the electric power tool configured as described above, a kickback of the main body from the workpiece is detected not based on a rotation speed of the motor but based on the attitude change amount of the main body. Accordingly, the electric power tool of the present disclosure can achieve an improved accuracy of kickback detection compared with a conventional apparatus in which a kickback is detected based on a change rate of a rotation speed of a motor. Thus, misdetection of a kickback can be reduced.

The detector may be configured to detect, as the attitude change amount, a moving speed of the main body and/or a moving amount of the main body in at least one axis direction of the main body. In this case, the kickback determiner can detect a kickback when the main body moves in the at least one axis direction, for example, at a high speed or greatly in a short time.

The detector may comprise an acceleration sensor configured to detect an acceleration of the main body in the at least one axis direction. In this case, the detector may be configured to integrate the acceleration detected by the acceleration sensor, to thereby detect the moving speed and/or the moving amount. Also in this case, the detector may be configured to remove a gravity acceleration component from the acceleration detected by the acceleration sensor.

The detector may be configured to detect, as the attitude change amount, a rotation speed of the main body and/or a rotation amount of the main body around at least one axis of the main body. In this case, the kickback determiner can determine occurrence of a kickback when the main body rotates around the at least one axis, for example, at a high speed or greatly in a short time. The detector may comprise an angular speed sensor configured to detect an angular speed of the main body around the at least one axis of the main body. In this case, the detector may be configured to integrate the angular speed detected by the angular speed sensor, to thereby detect the rotation amount.

The electric power tool may further comprise a processing operation-ongoing determiner configured to determine that a processing operation of the workpiece by the electric power tool is ongoing when a load applied from the tool portion to the main body exceeds a preset operation-ongoing determination threshold during driving of the motor. In this case, the kickback determiner may be configured to determine whether the main body is kicked back from the workpiece (in other words, whether a kickback has occurred) based on the attitude change amount of the main body when the processing operation-ongoing determiner determines that the processing operation by the electric power tool is ongoing.

With such configuration, it is possible to limit a time period in which the kickback determiner determines occurrence of a kickback to only a time period when the processing operation of the workpiece by the electric power tool is ongoing and a kickback may occur. Accordingly, it is possible to reduce misdetection of a kickback under a condition where no kickback should occur, and thereby achieve an improved accuracy of kickback detection.

When a kickback occurs during the processing operation of the workpiece, the load applied from the tool portion to the motor and/or the main body may be reduced. Accordingly, the processing operation-ongoing determiner may be configured to determine that the processing operation by the electric power tool is ongoing during a time period from when the load exceeds a preset operation start determination threshold until a specified delay time has elapsed since the load falls below a preset operation end determination threshold. In this case, it is possible to set a kickback determination time period, which is set by a determination operation of the processing operation-ongoing determiner, to include a time period in which the load is reduced due to occurrence of a kickback, to thereby achieve a further improved accuracy of kickback detection.

The load to set the kickback determination time period as described above may be detected, for example, based on a rotational torque of the motor, a current flowing in the motor, a rotation speed of the motor, etc., or may be detected based on vibration occurring in the main body.

The electric power tool may further comprise a stopper configured to stop driving of the motor when the kickback determiner determines that the main body is kicked back from the workpiece. In this case, misdetection of a kickback is reduced, and it is possible to inhibit causing an uncomfortable feeling to a user of the electric power tool even when driving of the motor is stopped. Further, by stopping the driving of the motor when the electric power tool is kicked back from the workpiece, it is possible to inhibit damaging a surrounding of the workpiece.

The electric power tool may further comprise a controller configured to control driving of the motor through the driver. In this case, it is possible to drive the motor more appropriately.

The main body may be configured to house at least the motor and the driver in the main body, and also may be configured such that the tool portion is mounted to one end of the main body.

Another aspect of the present disclosure is a method for detecting a kickback of an electric power tool from a workpiece. The method comprises detecting an attitude change amount of at least a part of the electric power tool when the electric power tool is being driven; determining whether the attitude change amount exceeds a preset threshold; and determining that the electric power tool is kicked back from the workpiece when the attitude change amount exceeds the preset threshold. According to this method, similar effects as in the above-described electric power tool can be achieved.

BRIEF DESCRIPTION OF THE DRAWINGS

An embodiment of the present disclosure will be described hereinafter by way of example with reference to the accompanying drawings, in which.

DETAILED DESCRIPTION OF THE PREFERRED EMBODIMENTS

Figure 1:
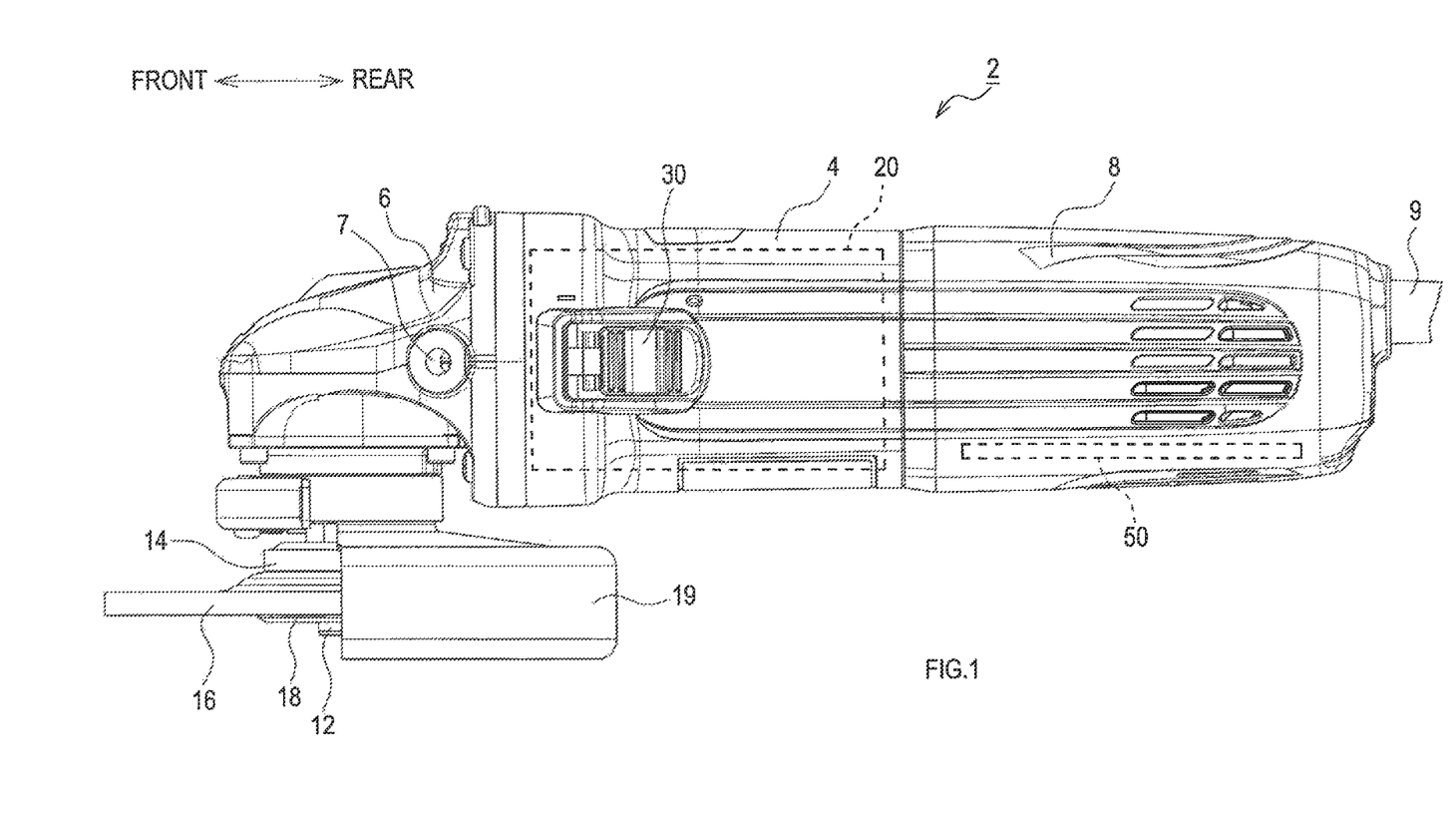
FIG. 1 is an outline view showing a configuration of a grinder of the embodiment.

In the example embodiment, a description will be given of a case where the present disclosure is applied to a grinder, which is one example of an electric power tool. As shown in FIG. 1, a main body portion (hereinafter referred to as a "main body") of a grinder 2 of the present embodiment comprises a motor housing 4, a gear housing 6, and a rear cover 8.

The motor housing 4 is a generally cylindrical housing that houses a motor 20. The motor 20 is housed in the motor housing 4 such that a rotation shaft of the motor 20 is parallel to a virtual central axis of the motor housing 4 that extends in a front-rear direction of the motor housing 4.

One end of the rotation shaft of the motor 20 extends into the gear housing 6 provided to a front end of the motor housing 4, and is coupled, through a gear mechanism provided in the gear housing 6, to a spindle 12 extending externally from the gear housing 6. The spindle 12 is rotatably provided in the gear housing 6 such that a central axis of the spindle 12 is perpendicular to the rotation shaft of the motor 20. The gear mechanism in the gear housing 6 comprises a bevel gear and the like to convert a rotation of the motor 20 to a rotation of the spindle 12. The gear mechanism has a similar configuration to that of a common grinder, and no detailed description thereof will be given herein.

The spindle 12 extending from the gear housing 6 comprises an inner flange 14 to positionally fix a tip tool 16 having a disk-shape. A lock nut 18 to hold the tip tool 16 with the inner flange 14 is screwed to the spindle 12 at a position closer to a top end of the spindle 12 than the inner flange 14.

Accordingly, by arranging the tip tool 16 between the inner flange 14 and the lock nut 18 and then fastening the lock nut 18 toward the inner flange 14, the tip tool 16 is securely fixed.

In the grinder 2 of the present embodiment, a grinding wheel, a cutting grindstone, a wire brush, etc. may be used as the tip tool 16, and the tip tool 16 is detachably attachable to the grinder 2.

In the gear housing 6, around an extending portion of the spindle 12 is fixed a wheel cover 19 to protect a user from scattering of fragments of a workpiece or the tip tool 16 that may be caused during operation of grinding, polishing, cutting, etc.

Side walls of the gear housing 6 each comprise a grip attachment hole 7 to enable to externally attach a grip for manual holding by a user of the grinder 2.

The rear cover 8 is provided to a rear end of the motor housing 4. A power cord 9 to receive power supply from a commercial power source, which is an AC power source 10 (see FIG. 2), extends from a rear end of the rear cover 8.

A leading end of the power cord 9 comprises a power plug (not shown) that can be coupled to an outlet of the AC power source 10. By inserting the power plug into the outlet, an alternating current power can be supplied from the AC power source 10 to the grinder 2.

A controller 50 to drive control the motor 20 using the alternating current power supplied from the AC power source 10 is housed in the rear cover 8. An operation switch 30 is provided to a side wall of the motor housing 4 to enable a user to selectively complete or interrupt a current conduction path that supplies power from the power cord 9 to the controller 50 (and thus to the motor 20).

Figure 2:
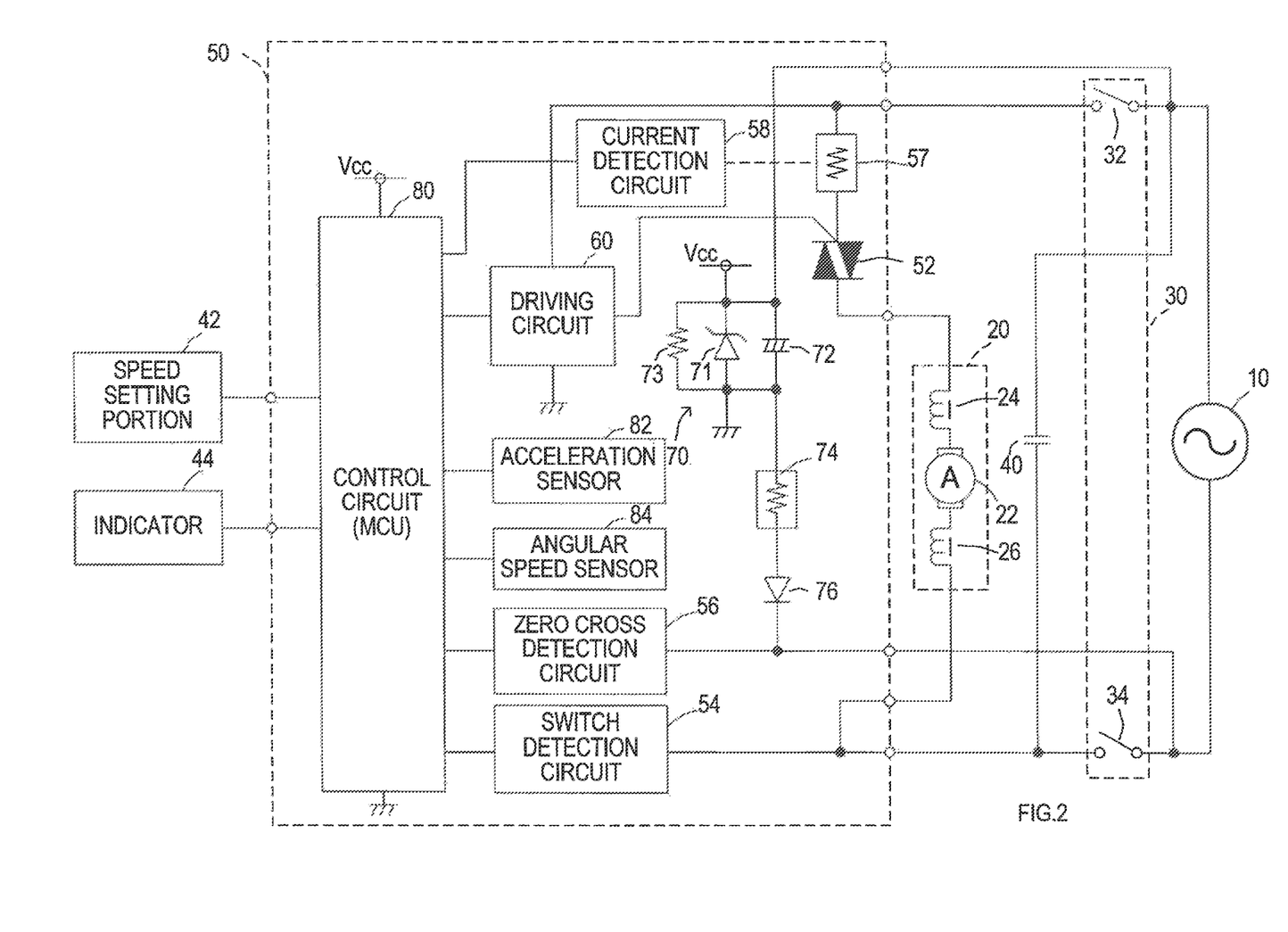
FIG. 2 is a block diagram showing a configuration of an entire drive system of the grinder.

The controller 50 comprises various circuit components as shown in FIG. 2 mounted on a circuit board. In FIG. 1, the circuit board is shown as the controller 50.

The operation switch 30 comprises a contact 32 and a contact 34 as shown in FIG. 2. The contact 32 and the contact 34 are provided, respectively, to a first current conduction path and a second current conduction path that couple the AC power source 10 to the controller 50 (and thus to the motor 20), and respectively complete or interrupt the first current conduction path and the second current conduction path. A user can turn on or off the contacts 32, 34 substantially at the same time by sliding an operating portion of the operation switch 30 exposed from the motor housing 4.

The motor 20 of the present embodiment is a commutator motor (a so-called brushed motor). Specifically, the motor 20 comprises an armature, mechanical commutators, and a brush, and is configured to change a current flowing in the armature in accordance with a rotational phase, to thereby maintain a rotational moment in a constant direction.

More specifically, the motor 20 is a single-phase series commutator motor (a so-called universal motor), comprises a field winding 24, an armature 22, and a field winding 26 serially coupled together, and is configured to be drivable by either alternating current or direct current.

The controller 50 comprises a third current conduction path to couple a first end of the motor 20 to the contact 32 of the operation switch 30 and a fourth current conduction path to couple a second end of the motor 20 to the contact 34 of the operation switch 30. The third current conduction path comprises a two-way thyristor 52 and a resistor 57.

The resistor 57 is provided to detect an electric current (a motor current) flowing in the motor 20. A current detection circuit 58 is coupled to the resistor 57. The current detection circuit 58 detects a value of the motor current from a voltage across the resistor 57.

The two-way thyristor 52 is a current driving semiconductor device. In the present embodiment, when the operation switch 30 is in an ON-state, the two-way thyristor 52 is switched between an ON-state and an OFF-state in accordance with a command from a control circuit 80, and thereby a conduction current to the motor 20 is controlled.

The controller 50 comprises a driving circuit 60 to drive the two-way thyristor 52, a switch detection circuit 54 to detect an operating state of the operation switch 30, and a zero cross detection circuit 56 to detect a zero cross point of an alternating voltage supplied from the AC power source 10.

The switch detection circuit 54 detects a change to the ON-state of the operation switch 30 based on a voltage change in the second current conduction path between the contact 34 of the operation switch 30 and the motor 20.

The zero cross detection circuit 56 is coupled to the second current conduction path between the contact 34 of the operation switch 30 and the AC power source 10, and detects the zero cross point of the alternating voltage based on a voltage change at the coupled point.

The switch detection circuit 54, the zero cross detection circuit 56, the current detection circuit 58, and the driving circuit 60 are coupled to the control circuit 80. Also, a speed setting portion 42 to be operated by a user and an indicator 44 to indicate a state of the grinder 2 are coupled to the control circuit 80.

The control circuit 80 comprises a Micro Controller Unit (MCU) comprising a CPU, a ROM, a RAM, etc. When the operation switch 30 is in the ON-state, the control circuit 80 controls the motor current by adjusting a time period from the zero cross point detected by the zero cross detection circuit 56 to turning on of the two-way thyristor 52 in accordance with a driving speed set through the speed setting portion 42. Also, the control circuit 80 indicates an operating state of the grinder 2 on the indicator 44.

The driving circuit 60 is configured to flow a current to a gate of the two-way thyristor 52 in accordance with a control signal outputted from the control circuit 80 to bring the two-way thyristor 52 into the ON-state, to thereby feed the current to the motor 20. Thus, the control circuit 80 can control the current flowing to the motor 20 through the driving circuit 60.

The controller 50 comprises a power supply circuit 70 that generates a power supply voltage (a direct current voltage) Vcc to drive various internal circuits, including the control circuit 80. The power supply circuit 70 operates receiving power supply directly from the AC power source 10 so that the control circuit 80 is operable even when the operation switch 30 is in an OFF-state.

More specifically, the power supply circuit 70 comprises a Zener diode 71, a capacitor 72, and a resistor 73. A first end of the Zener diode 71, a first end of the capacitor 72, and a first end of the resistor 73 are coupled to the first current conduction path between the contact 32 of the operation switch 30 and the AC power source 10. A second end of the Zener diode 71, a second end of the capacitor 72, and a second end of the resistor 73 are coupled to the second current conduction path between the contact 34 of the operation switch 30 and the AC power source 10, through a resistor 74 and a diode 76.

The Zener diode 71 is provided to generate a power supply voltage Vcc that is equal to a breakdown voltage of the Zener diode 71. A cathode of the Zener diode 71 is coupled to a power supply line in the controller 50, and is also coupled to the first current conduction path between the contact 32 of the operation switch 30 and the AC power source 10. An anode of the Zener diode 71 is coupled to a ground line of the controller 50.

The capacitor 72 is parallel-coupled to the Zener diode 71 and stabilizes the power supply voltage Vcc. The resistor 73 is provided to release electric charges accumulated in the capacitor 72 to the ground after the power cord 9 is pulled out from the AC power source 10.

An anode of the diode 76 is coupled to the anode of the Zener diode 71 (that is, the ground line) through the resistor 74, whereas a cathode of the diode 76 is coupled to the second current conduction path between the contact 34 of the operation switch 30 and the AC power source 10.

The diode 76 arranged as described above limits a current flow from the AC power source 10 to the power supply circuit 70 to one direction. That is, the diode 76 functions as a rectifier circuit to limit the current flow in that manner. The resistor 74 absorbs a voltage change obtainable by subtracting the breakdown voltage of the Zener diode 71 and a forward voltage of the diode 76 from an output voltage of the AC power source 10.

As described above, the motor 20 is a commutator motor, in which the mechanical commutators contacted by the brush are changed in accordance with the rotation of the motor 20. As a result, a noise having a higher frequency than a frequency of the AC power source 10 occurs in the motor 20. In order to absorb the noise, a capacitor 40 is provided between the first current conduction path and the second current conduction path. More specifically, a first end of the capacitor 40 is coupled to the first current conduction path between the contact 32 of the operation switch 30 and the AC power source 10, whereas a second end of the capacitor 40 is coupled to the second current conduction path between the contact 34 of the operation switch 30 and the controller 50.

In the grinder 2 of the present embodiment configured as described above, when a user operates the operation switch 30 while holding the motor housing 4 and other parts, which collectively form the main body of the grinder 2, the motor 20 is driven under the control of the control circuit 80, and the tip tool 16 is rotated.

When the tip tool 16 in this state is brought into abutment with a processing point of a workpiece, the workpiece can be processed by the tip tool 16; however, a reaction force is applied to the main body from the workpiece in abutment with the tip tool 16, and the main body is sometimes kicked back due to the reaction force.

When the main body is kicked back (in other words, when a kickback occurs), the tip tool 16 may bump against some member around the workpiece, resulting in damage of the member. Thus, the control circuit 80 automatically detects occurrence of a kickback while the motor 20 is being driven and stops the motor 20.

In the present embodiment, the controller 50 comprises an acceleration sensor 82 and an angular speed sensor 84 so that occurrence of a kickback can be detected based on an attitude change of the main body. A detection signal from the acceleration sensor 82 and a detection signal from the angular speed sensor 84 are inputted to the control circuit 80.

The acceleration sensor 82 comprises a three-axis acceleration sensor capable of detecting accelerations in three-axis (an X-axis, a Y-axis, and a Z axis) directions that are mutually perpendicular in the main body. The angular speed sensor 84 comprises a three-axis angular speed sensor capable of detecting angular speeds (for example, pitch, roll, yaw) around the three axes (the X-axis, the Y-axis, and the Z axis).

The acceleration sensor 82 and the angular speed sensor 84 are assembled to the controller 50 such that, for example, a rotation center axis of the motor 20 is set to the X-axis, a rotation center axis of the spindle 12 is set to the Y-axis, and a direction perpendicular to these two axes is set to the Z axis.

However, the acceleration sensor 82 and the angular speed sensor 84, which are only required to be capable of detecting attitude changes of the main body when a kickback occurs, need not be assembled integrally with the controller 50, but may be assembled to the motor housing 4 or the gear housing 6 included in the main body. Also, the acceleration sensor 82 or the angular speed sensor 84 need not always be a three-axis sensor, but may be a single-axis or two-axis sensor.

Figure 3A:
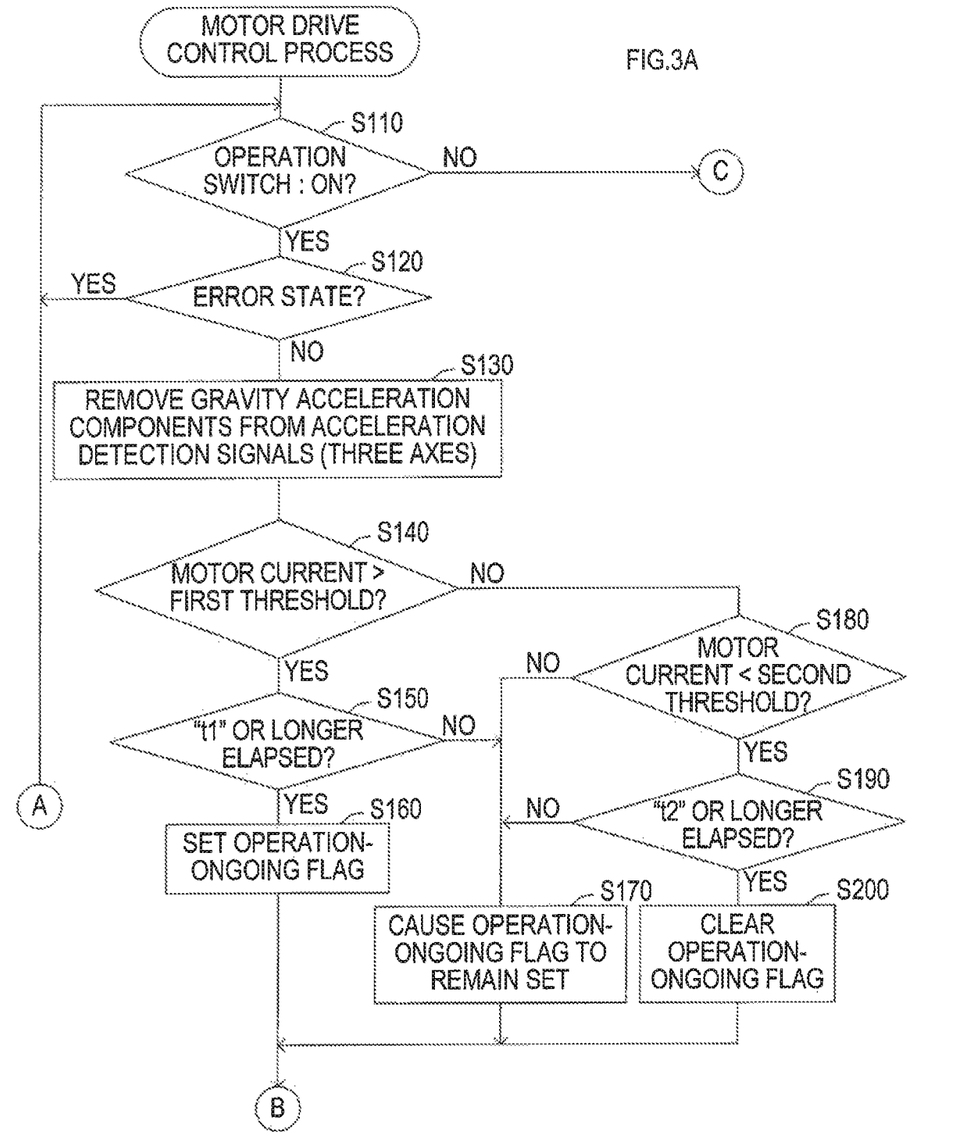
FIG. 3A is a flowchart showing a part of a motor drive control process executed by a control circuit.
Figure 3B:
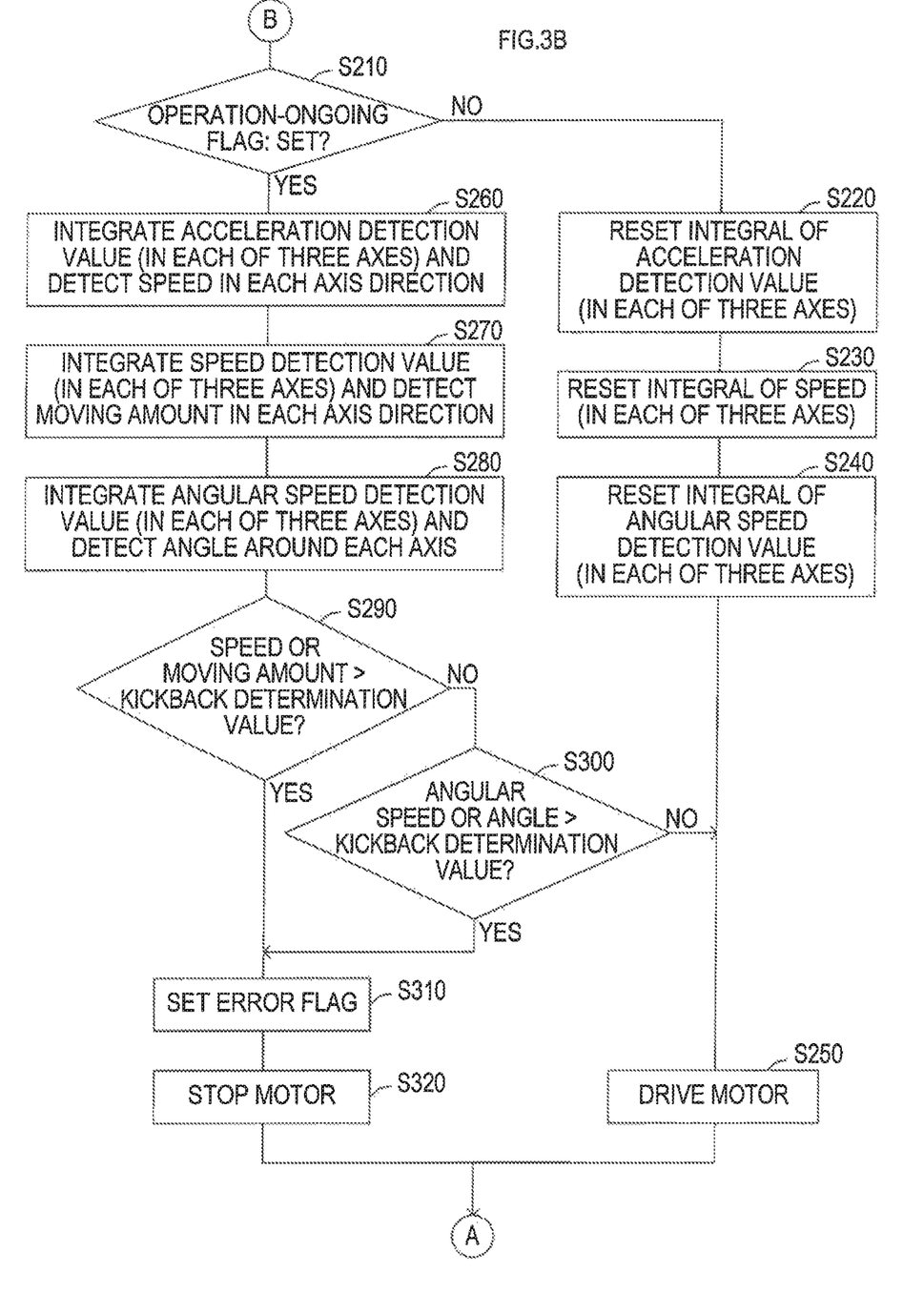
FIG. 3B is a flowchart showing another part of the aforementioned motor drive control process.
Figure 3C:
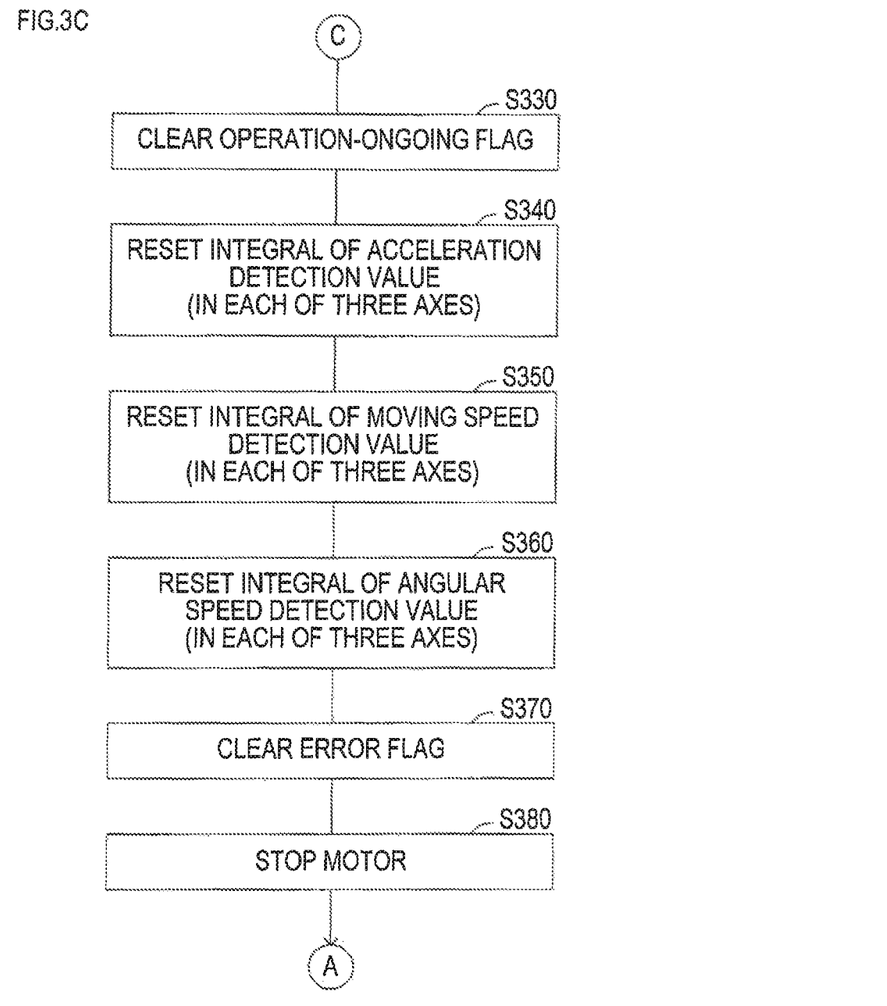
FIG. 3C is a flowchart showing the remaining part of the aforementioned motor drive control process.

Next, a description will be given of a motor drive control process executed by the control circuit 80 to drive the motor 20 with reference to a flowchart shown in FIGS. 3A-3C.

The motor drive control process is a process executed repeatedly by the control circuit 80 as one of main routines. In the motor drive control process, it is first determined in S110 ("S" denotes "Step") whether the operation switch 30 is in the ON-state.

If the operation switch 30 is in the ON-state, it is determined in S120 whether an error flag, which is set when a kickback has occurred in a later-described process, is set, to thereby determine whether the grinder 2 is in an error state.

If it is determined in S120 that the error flag is set and thus the grinder 2 is in the error state, the process returns to S110, whereas if it is determined that the grinder 2 is not in the error state, the process proceeds to S130.

In S130, by performing a filtering process of acceleration detection signals in the three axis directions inputted from the acceleration sensor 82, gravity acceleration components are removed from the acceleration detection signals. Then, the process proceeds to S140. The filtering process in S130 is performed, for example, using a high-pass filter having a cutoff frequency of approximately 1 to 10 Hz.

In S140, it is determined whether the motor current detected by the current detection circuit 58 exceeds a first threshold that is preset. If it is determined that the motor current exceeds the first threshold, the process proceeds to S150, and then it is determined whether a state where the motor current exceeds the first threshold has continued for a set time period "t1" or longer.

If it is determined in S150 that the state where the motor current exceeds the first threshold has continued for the set time period "t1" or longer, then it is determined that currently a load applied from the tip tool 16 to the motor 20 is great, and thus a processing operation of a workpiece is ongoing. Then, the process proceeds to S160. In S160, an operation-ongoing flag is set, and then the process proceeds to S210.

If it is determined in S150 that the state where the motor current exceeds the first threshold has not continued for the set time period "t1" or longer, the process proceeds to S170, in which the operation-ongoing flag is caused to remain set. Then, the process proceeds to S210.

Figure 4:
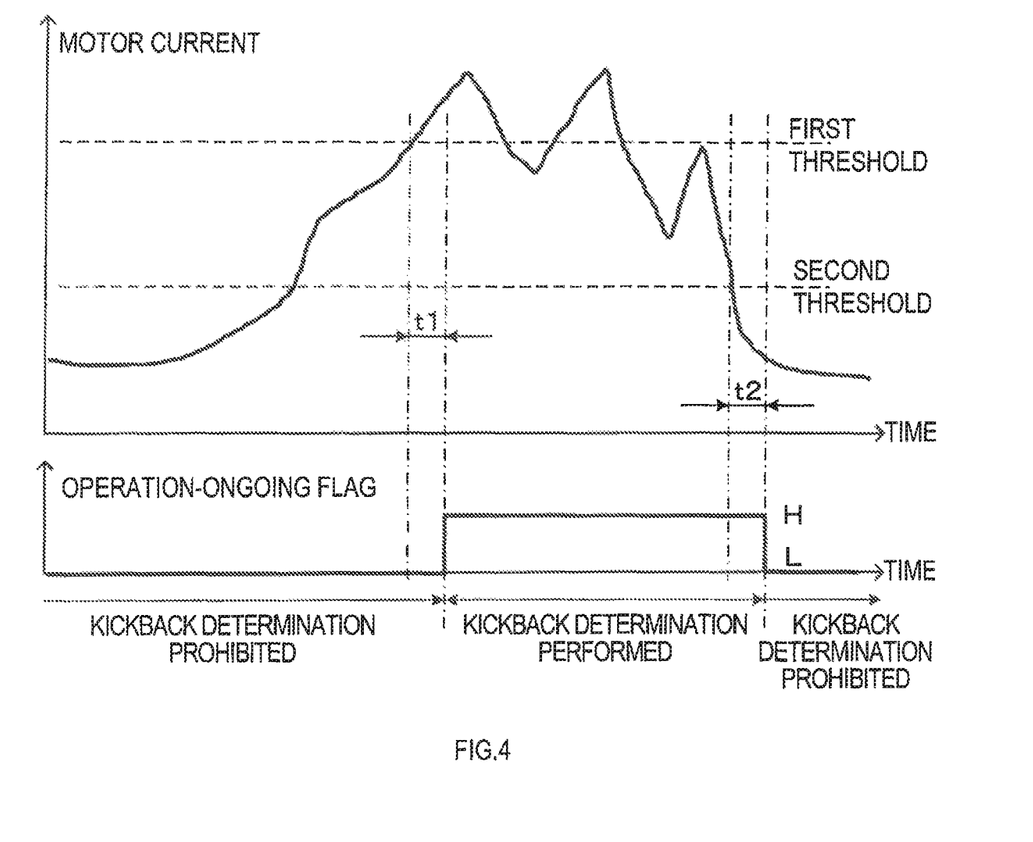
FIG. 4 is a time chart illustrating a kickback determination time period.

If it is determined in S140 that the motor current does not exceed the first threshold, the process proceeds to S180, in which it is determined whether the motor current is less than a second threshold. As shown in FIG. 4, the second threshold is a current value lower than the first threshold. In S180, it is determined, based on the motor current, whether the load applied from the tip tool 16 to the motor 20 is lower than that when the processing operation of the workpiece is ongoing.

If it is determined in S180 that the motor current is less than the second threshold, the process proceeds to S190, in which it is determined whether a state where the motor current is less than the second threshold has continued for a set time period "t2" or longer. If it is determined that the state has continued for the set time period "t2" or longer, the process proceeds to S200. In S200, the operation-ongoing flag is cleared, and then the process proceeds to S210.

If it is determined in S180 that the motor current is equal to or more than the second threshold, or if it is determined in S190 the state has not continued for the set time period "t2" or longer, the process proceeds to S170. In S170, the operation-ongoing flag is caused to remain set, and then the process proceeds to S210.

The first threshold is a threshold to determine, based on the motor current, that after driving of the motor 20 is started, the tip tool 16 is brought into abutment with the workpiece to process the workpiece, and thereby the load applied from the tip tool 16 to the motor 20 is increased. The first threshold is one example of an operation start determination threshold of the present disclosure.

The second threshold is a threshold to determine, based on the motor current, that after processing of the workpiece by the grinder 2 is started, the tip tool 16 is separated from the workpiece, and thereby the load applied from the tip tool 16 to the motor 20 is decreased. The second threshold is one example of an operation end determination threshold of the present disclosure.

In S140 to S200, as shown in FIG. 4, when the motor current exceeds the first threshold and the state has continued for the set time period "t1" or longer, the operation-ongoing flag is set, and it is stored that a processing operation of the workpiece is currently ongoing.

Also, once the operation-ongoing flag is set, the operation-ongoing flag remains set until the motor current falls below the second threshold and thereafter a specified delay time (in other words, the set time period "t2") has elapsed. When the set time period "t2" has elapsed, the operation-ongoing flag is cleared.

The operation-ongoing flag is a flag to define a kickback determination time period. In S210, it is determined whether the operation-ongoing flag is set, to thereby determine whether it is currently in the kickback determination time period.

If it is determined in S210 that the operation-ongoing flag is not set, it is currently not in the kickback determination time period, and the process proceeds from S220 to S240, in which various integral values to be used for kickback determination in later-described processes are reset.

Specifically, in S220, a moving speed that is an integral value of an acceleration detection value calculated in later-described S260 is set to an initial value (0). In S230, a moving amount that is an integral value of the moving speed calculated in later-described S270 is set to an initial value (0). In S240, a rotation angle that is an integral value of an angular speed detection value calculated in later-described S280 is set to an initial value (0).

Subsequent to the processes in S220 to S240, the process proceeds to S250, in which the motor 20 is driven, and then the process proceeds to S110. If it is determined in S210 that the operation-ongoing flag is set, the process proceeds to S260 to determine, based on an attitude change of the grinder 2, whether the grinder 2 is kicked back from the workpiece (in other words, a kickback has occurred).

In S260, an acceleration detection value in each of the three axis directions detected by the acceleration sensor 82 is integrated, to thereby detect a moving speed in each axis direction of the main body. In S270, the moving speed is integrated, to thereby detect a moving amount of the main body in each axis direction.

In S280, an angular speed detection value around each of the three axes detected by the angular speed sensor 84 is integrated, to thereby detect a rotation amount (in other words, a rotation angle) around each axis of the main body, and then the process proceeds to S290.

In S290, it is determined whether the moving speed of the main body or the moving amount of the main body in each axis direction detected in S260 and in S270 is greater than a corresponding kickback determination value (more specifically a determination speed or a determination moving amount) that is preset to determine occurrence of a kickback.

If it is determined in S290 that the moving speed of the main body or the moving amount of the main body in any axis direction is greater than the corresponding kickback determination value, then it is determined that an attitude change amount of the main body is large, and thus a kickback, which is kicking back of the grinder 2 from the workpiece, has occurred. Then, the process proceeds to S310.

If it is determined in S290 that the moving speed of the main body and the moving amount of the main body in each axis direction are all equal to or lower than the corresponding kickback determination values, then it is determined that no kickback is detected based on the moving speed or the moving amount in each axis direction. Then, the process proceeds to S300.

In S300, it is determined whether the angular speed around each axis detected by the angular speed sensor 84 or the rotation angle around each axis detected in S280 is greater than a preset corresponding kickback determination value (more specifically, a determination angular speed or a determination angle).

If it is determined in S300 that the angular speed or the rotation angle around any axis is greater than the corresponding kickback determination value, then it is determined that an attitude change amount of the main body is large, and thus a kickback, which is kicking back of the grinder 2 from the workpiece, has occurred. Then, the process proceeds to S310.

In S310, the error flag is set based on the determination that a kickback has occurred. In subsequent S320, driving of the motor 20 is stopped, and then the process proceeds to S110. If it is determined in S300 that the angular speed and the rotation angle around each axis are all equal to or lower than the corresponding kickback determination values, then it is determined that no kickback is detected based on the angular speed or the rotation angle around each axis (in other words, no kickback has occurred), and the process proceeds to S250. In S250, the motor 20 is driven as described above, and then the process proceeds to S110.

Next, if it is determined in S110 that the operation switch 30 is not in the ON-state (that is, the operation switch 30 is in the OFF-state), there is no need to drive the motor 20, and thus the process proceeds to S330, in which the operation-ongoing flag is cleared.

In subsequent S340 to S360, various integral values to be used for kickback determination are reset in a similar manner as in the above-described S220 to S240, and then the process proceeds to S370. In S370, the error flag is cleared, and in S380, driving of the motor 20 is stopped. Then, the process proceeds to S110.

As described above, in the grinder 2 of the present embodiment, the control circuit 80 as a controller detects kicking back (or kickback) of the grinder 2 from a workpiece not based on the rotation speed of the motor 20, but based on the attitude change of the main body of the grinder 2. When detecting a kickback, the control circuit 80 stops driving of the motor 20.

Accordingly, the grinder 2 of the present embodiment can achieve an improved accuracy of kickback detection compared with a conventional apparatus that detects a kickback based on a change rate of the rotation speed of a motor. Thus, misdetection of a kickback can be reduced.

Also, in the present embodiment, the moving speed and the moving amount in each of the three axis directions as well as the angular speed and the rotation angle around each of the three axes are detected using the acceleration sensor 82 and the angular speed sensor 84, and occurrence of a kickback is detected if any one of these parameters exceeds the corresponding kickback determination value.

Accordingly, the grinder 2 of the present embodiment can detect a kickback more accurately based on the attitude change of the main body when the kickback has occurred.

Also, when the motor 20 is driven, the control circuit 80 detects the load applied from the tip tool 16 to the main body based on the motor current, and sets the operation-ongoing flag to thereby start kickback determination if the specified delay time "t1" has elapsed since the motor current exceeds the first threshold, which is for determination of start of operation. After kickback determination is started, if the motor current falls below the second threshold, which is for determination of end of operation, and then the specified delay time "t2" has elapsed since the motor current falls below the second threshold, the control circuit 80 resets the operation-ongoing flag and terminates kickback determination.

Accordingly, in the present embodiment, it is possible to limit the kickback determination time period to only a time period when a kickback may occur due to driving of the motor 20, and to thereby reduce misdetection of a kickback under a condition where no kickback should occur.

Particularly, in the present embodiment, kickback determination is performed until the specified delay time "t2" has elapsed since the motor current falls below the second threshold for determination of end of operation.

Accordingly, even when the load applied to the motor 20 is reduced steeply due to occurrence of a kickback, and the motor current falls below the second threshold, it is possible to detect the kickback based on the attitude change of the main body that is detected thereafter, and thus to achieve an improved accuracy of kickback detection.

Also, in the present embodiment, when occurrence of a kickback is detected, driving of the motor 20 is stopped. Then, misdetection of a kickback is reduced, and it is possible to inhibit stopping driving of the motor 20 and a resulting uncomfortable feeling to a user when no kickback occurs. Further, by stopping the driving of the motor 20, it is possible to inhibit the grinder 2 that is kicked back from damaging a surrounding of a workpiece. In the present embodiment, the tip tool 16 corresponds to one example of a tool portion of the present disclosure; the driving circuit 60 corresponds to one example of a driver of the present disclosure; an MCU 80, the acceleration sensor 82, and the angular speed sensor 84 correspond to one example of a detector of the present disclosure; the MCU 80 corresponds to one example of a kickback determiner of the present disclosure, to one example of a processing operation-ongoing determiner of the present disclosure, and to one example of a stopper of the present disclosure.

Although one example embodiment of the present disclosure has been described above, the present disclosure is not limited to the aforementioned embodiment but may be practiced in various modified forms. For example, in the aforementioned embodiment, the moving speeds and the moving amounts in the three axis directions are detected using the acceleration sensor 82, and the angular speeds and the rotation angles around the three axes are detected using the angular speed sensor 84, in order to detect a kickback.

However, a moving direction of a kickback of the main body from a workpiece and a rotating direction of the main body caused by the kickback may be specified depending on a type of an electric power tool and on details of the operation; thus, parameters for kickback detection may be set depending on the moving direction and the rotating direction of the main body.

Specifically, as parameters for kickback detection, suitable parameters for detecting a kickback of the electric power tool may be appropriately selected from among the aforementioned moving speed and moving amount in three axis directions, and angular speed and rotation angle around three axes.

Also, although the kickback determination time period is set based on the motor current detected by the current detection circuit 58 in the aforementioned embodiment, it may be sufficient as long as the kickback determination time period is set based on the load applied from the tip tool 16 to the main body during the processing operation of a workpiece.

In this case, the load applied from the tip tool 16 to the main body may be detected based not only on the motor current, but also on a rotational torque of the motor 20, a rotation speed (a rotation fluctuation) of the motor 20, or the like, or may be detected based on a vibration occurring in the main body or the like. Thus, the kickback determination time period may be set by comparing each of these parameters with a corresponding threshold for determining whether operation is ongoing.

Further, although the aforementioned embodiment describes the grinder 2 by way of example, the electric power tool of the present disclosure may be any electric power tool that is kicked back from a workpiece due to a reaction force of the workpiece during processing of the workpiece, and such electric power tool can achieve similar effects to those in the aforementioned embodiment. Specifically, the electric power tool of the present disclosure may be, for example, a power saw with a rotary cutting blade, an electric chainsaw, and the like.

Although the grinder 2 of the aforementioned embodiment is of an alternating current driven type, the electric power tool of the present disclosure may be a rechargeable electric power tool that operates on power supply from a rechargeable battery.

Although the control circuit 80 of the aforementioned embodiment is an MCU, a combination of various individual electronic components may be employed in place of or in addition to the MCU, or an Application Specified Integrated Circuit (ASIC), an Application Specific Standard Product (ASSP), a programmable logic device, such as a Field Programmable Gate Array (FPGA), or a combination thereof may be employed in place of or in addition to the MCU.

Moreover, a plurality of functions performed by a single element of the aforementioned embodiment may be achieved by a plurality of elements, or a function performed by a single element may be achieved by a plurality of elements. Also, a plurality of functions performed by a plurality of elements may be achieved by a single element, or a function performed by a plurality of elements may be achieved by a single element. Further, a part of a configuration of the aforementioned embodiment may be omitted, or at least a part of a configuration of the aforementioned embodiment may be added to, or may replace, other configuration of the aforementioned embodiment. Any forms within the technical idea defined only by the language of the accompanying claims may be embodiments of the present disclosure.

What is claimed is:

1. An electric power tool comprising:
a main body configured to be mounted with a tool portion, the tool portion being configured to process a workpiece;
a motor configured to generate a driving force for driving the tool portion mounted to the main body;
a driver configured to drive the motor;
a detector configured to detect a parameter related to movement of the main body;
a kickback determiner configured to determine that the main body is kicked back from the workpiece when the parameter detected by the detector exceeds a preset kickback determination threshold during driving of the motor by the driver; and
an activator configured to activate the kickback determiner in response to the activator determining a load applied from the tool portion to the main body exceeds a preset load threshold during driving of the motor,
wherein the activator is configured to activate the kickback determiner during a time period from when a first signal is received indicating the load exceeds a preset operation start determination threshold until a second signal is received indicating a clear-delay time has elapsed after the load falls below a preset operation end determination threshold.

2. The electric power tool according to claim 1,
wherein the detector is configured to detect, as the parameter, a moving speed of the main body and/or a moving amount of the main body in at least one axis direction of the main body.

3. The electric power tool according to claim 2,
wherein the detector comprises an acceleration sensor configured to detect an acceleration of the main body in the at least one axis direction.

4. The electric power tool according to claim 3,
wherein the detector is configured to integrate the acceleration detected by the acceleration sensor, to thereby detect the moving speed and/or the moving amount.

5. The electric power tool according to claim 3,
wherein the detector is configured to remove a gravity acceleration component from the acceleration detected by the acceleration sensor.

6. The electric power tool according to claim 1,
wherein the detector is configured to detect, as the parameter, a rotation speed of the main body and/or a rotation amount of the main body around at least one axis of the main body.

7. The electric power tool according to claim 6,
wherein the detector comprises an angular speed sensor configured to detect an angular speed of the main body around the at least one axis of the main body.

8. The electric power tool according to claim 7,
wherein the detector is configured to integrate the angular speed detected by the angular speed sensor, to thereby detect the rotation amount.

9. The electric power tool according to claim 1, further comprising:
a stopper configured to stop driving of the motor when the kickback determiner determines that the main body is kicked back from the workpiece.

10. The electric power tool according to claim 1, further comprising:
a controller configured to control driving of the motor through the driver.

11. The electric power tool according to claim 1,
wherein the main body is configured to house at least the motor and the driver in the main body.

12. The electric power tool according to claim 1,
wherein the main body is configured such that the tool portion is mounted to one end of the main body.

13. The electric power tool according to claim 1,
wherein the activator is configured to activate the kickback determiner in response to the load exceeding a preset operation start determination threshold at least during a set-delay time period.

14. The electric power tool according to claim 1,
wherein the activator is configured to detect the load based on at least one of a current flowing to the motor, a rotational torque of the motor, a rotation speed of the motor, and a vibration occurring in the main body.

15. A method for detecting kickback of an electric power tool from a workpiece comprising:
detecting a parameter related to movement of at least a part of the electric power tool when the electric power tool is being driven;
determining that a processing operation of the workpiece by the electric power tool is ongoing during a time period from when a circuit determines that a load applied to the electric power tool exceeds a preset load threshold during driving of the electric power tool until a clear-delay time has elapsed after the load falls below a preset operation end determination threshold;
determining whether the parameter exceeds a preset threshold in response to a determination that the processing operation by the electric power tool is ongoing; and
determining that the electric power tool is kicked back from the workpiece when the parameter exceeds the preset threshold.

* * * * *